United States Patent Office
3,642,946
Patented Feb. 15, 1972

3,642,946
GRAFT COPOLYMER-POLYCARBONATE-
POLYSULFONE BLENDS
Thomas S. Grabowski, Vienna, W. Va., assignor to Borg-
Warner Corporation, Chicago, Ill.
No Drawing. Filed Oct. 23, 1969, Ser. No. 868,888
Int. Cl. C08g 39/10
U.S. Cl. 260—873       5 Claims

ABSTRACT OF THE DISCLOSURE

This invention relates to ternary blends of ABS graft polymer, polycarbonate and polysulfones which are useful for a variety of applications wherein high impact strengths and high heat distortion temperatures are required.

BACKGROUND OF INVENTION

Prior to this invention, a large variety of polymeric materials were prepared to meet the needs of the thermoplastic industry. Many of these polymers were ABS graft polymers which found use in applications such as housings on equipment, e.g., electrical drills, telephones, radios, etc. These polymeric materials were successful in meeting the requirements of impact strength, tensile strength, modulus and the like; however, were somewhat limited due to heat distortion temperatures.

Many potential thermoplastic applications also require higher impact strengths than normally obtained in ABS graft polymers. For example, parts used on farm machinery, automobiles, etc., are subjected to an abnormally high degree of vibration and abuse. In these applications, polymeric compositions such as polycarbonates and polycarbonate blends have provided the necessary higher impact strengths; however, have been relatively uneconomical when the polycarbonate content was high.

It is well known that the compounds such as the polycarbonates and polysulfones are difficult to process by themselves due to their relatively sharp melt points. Also, polysulfone, by itself has long been known to exhibit very low impact resistance. Attempts have been made to improve the impact strength of polysulfone by the addition of rubbery components; however, the rubbery components tended to substantially decrease the heat distortion temperatures of the resultant blends.

It has been suggested that polysulfone be added to graft polymer and this combination is described in U.S. Pat. 3,192,178 to Basdekis et al. The combination of polysulfone and ABS graft polymer and resin blends such as described in the aforementioned patent specification has had relatively little acceptance for high impact applications due to the unfavorable effect of the polysulfone on impact properties. It has also been suggested that polycarbonate be blended with ABS graft polymer and very good blends with high impact values have resulted. These compositions have, however, been somewhat limited in heat distortion properties.

A second major disadvantage of using the high molecular weight linear polymers, i.e., polysulfones and polycarbonates, has been their relatively high monomer costs. The high linear polymers are inherently less economical than ABS graft polymers as a result of their method of manufacture.

SUMMARY OF THE INVENTION

The present invention is directed to thermoplastic blends comprised of ABS graft polymer, polycarbonate and polysulfone. The resin blends contrary to what would be expected, have very high heat distortion temperatures, are easy to process and exhibit good tensile strengths and extraordinary impact strengths. Also, the blends are much more economical than polysulfone and/or polycarbonate. The resin blends are generally useful in the fabrication of a variety of thermoplastic components wherein high heat distortion temperatures combined with high impact strengths are required. The thermoplastic blends may be extruded or injection molded with ease and are economically preferable to either polycarbonate or polysulfone per se, additionally, the blends have many of the favorable fabrication properties of the ABS graft polymers per se. The components of the blends are compatible with each other and homogeneous mixtures are obtained without requiring the addition of plasticizers, lubricants or the like, to obtain homogeneity.

THE GRAFT POLYMER COMPONENT

The graft polymers that are utilized in the present invention are ABS graft polymers, the molecules of which consist of two or more polymeric parts of different composition chemically united. The graft polymers are preferably prepared by polymerizing at least one conjugated diene, such as butadiene, or a conjugated diene with a monomer polymerizable therewith, such as styrene, to provide a backbone, with subsequent polymerization of at least one grafting monomer, and preferably two in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

The specific conjugated diene monomers normally utilized in preparing the backbone of the graft polymer portion of the blends of this invention are generically described by the formula:

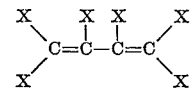

wherein X may be selected from the group consisting of hydrogen, alkyl groups containing from one to five carbon atoms, chloro and bromo. Examples of dienes that may be used are butadiene; isoprene; 1,2-heptadiene; methyl-1,3-pentadiene; 2,3-dimethyl-1,3-butadiene; 1,3-pentadiene; 2-methyl-3-ethyl-1,3-butadiene; 2-ethyl-1,3-pentadiene; 1,3- and 2,4-hexadienes, chloro and bromo substituted butadienes such as dichlorobutadiene, bromobutadiene, chloroprene, dibromobutadiene, mixtures thereof and the like. The preferred conjugated diene utilized herein is butadiene.

The first monomer or group of monomers polymerized in the presence of the prepolymerized backbone are preferably monovinylaromatic hydrocarbons. The monovinylaromatic monomers utilized are generically described by the formula:

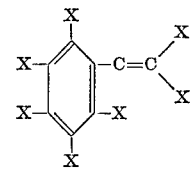

wherein X may be selected from the group consisting of hydrogen, alkyl groups containing from one to five carbon atoms, chloro and bromo. Examples of the monovinylaromatic compounds and substituted monovinylaromatic compounds that may be used are styrene, and other vinyl substituted aromatic compounds including alkyl-, cycloalkyl-, aryl-, alkaryl-, aralkyl-, alkoxy-, aryloxy and other substituted vinyl-aromatic compounds. Examples of such compounds are 3-methylstyrene; 3,5-diethylstyrene and 4-n-propylstyrene, α-methylstyrene, α-methylvinyltoluene, α-chlorostyrene, vinyltoluene, α-bromostyrene, chlorophenylethylenes, dibromophenylethylenes, tetrachlorophenylethylenes, 1 - vinylnaphthalene, 2 - vinylnaphthalene, mixtures thereof and the like. The preferred monovinylaromatic hydrocarbon used herein are styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. The acrylonitrile, substituted acrylonitrile, or acrylic acid esters are described generically by the formula:

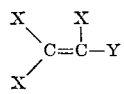

wherein X may be selected from the group consisting of hydrogen, alkyl groups containing from one to five carbon atoms, chloro and bromo and Y is selected from the group consisting of cyano and carbalkoxy wherein the alkyl group of the carbalkoxy group contains from one to about 12 carbon atoms. Examples of monomers of this description, i.e., acrylonitrile, substituted acrylonitrile, or acrylic acid esters of the above formula are acrylonitrile, ethacrylonitrile, methacrylonitrile, α-chloroacrylonitrile, β-chloroacrylonitrile, α-bromoacrylonitrile and β-bromoacrylonitrile, methyl acrylate, methyl methacrylate, ethyl acrylate, butyl acrylate, propyl acrylate, isopropyl acrylate, isobutyl acrylate, mixtures thereof and the like. The preferred acrylic monomer used herein is acrylonitrile and the preferred acrylic acid esters are ethyl acrylate and methyl methacrylate.

In the preparation of the graft polymer, the conjugated diolefin polymer or copolymer exemplified by 1,3-butadiene polymer or copolymer comprises from about 60% by weight to about 5% by weight of the total graft polymer composition and the monomers polymerized in the presence of the backbone exemplified by styrene and acrylonitrile comprise from about 40 to about 95% by weight of the total graft polymer composition.

The second group of grafting monomers, exemplified by acrylonitrile, ethyl acrylate or methyl methacrylate of the graft polymer composition, preferably comprise from about 10% to about 40% by weight of the total graft copolymer composition and the monovinylaromatic hydrocarbon exemplified by styrene comprise from about 30 to about 70% by weight of the total graft polymer composition.

In preparing the graft polymer of this invention, a certain percentage of the polymerizing monomers that are grafted on the backbone will occur as free copolymer. If styrene is utilized as one of the grafting monomers and acrylonitrile as the second grafting monomer, a certain portion of the composition will occur as styrene-acrylonitrile copolymer. In certain instances, one of the first group, i.e., monovinylaromatic monomers such as α-methylstyrene (or other monomer) is copolymerized with one of the second group, i.e., acryonitrile, substituted acryonitrile, etc., and a certain percentage of the composition is comprised of, for example, an α-methylstyrene-acrylonitrile copolymer (or other copolymer). It is contemplated in this invention that the composition referred to as graft polymer contain up to 90% copolymer existing either as free copolymer from preparation of the graft or as an added copolymer component. These added copolymers are preferably materials having high heat distortion temperatures such as is the case when α-methylstyrene-acrylonitrile copolymers are added.

THE POLYCARBONATES

The polycarbonates utilized in the preparation of the blends of this invention are of the general formulae

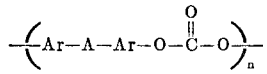    I and

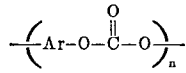    II wherein Ar is selected from the group consisting of phenylene and alkyl, alkoxyl, halogen and nitro-substituted phenylene; A is selected from the group consisting of carbon-to-carbon bonds, alkylidene, cycloalkylidene, alkylene, cycloalkylene, azo, imino, sulfur, oxygen, sulfoxide and sulfone, and $n$ is at least two.

The preparation of the polycarbonates is well known and the details thereof need not be delineated herein. There are a variety of preparative procedures set forth in Chemistry and Physics of Polycarbonates by Herman Schnell, Interscience Division of John Wiley & Co., New York (1964), first edition, as well as in British Pat. 772,627. In general, a preferred reaction is carried out by dissolving the dihydroxy component in a base such as pyridine and bubbling phosgene into the stirred solution at the desired rate. Tertiary amines may be used to catalyze the reaction as well as to act as acid acceptors throughout the reaction. Since the reaction is normally exothermic, the rate of phosgene addition can be used to control the reaction temperature. The reactions generally utilize equimolar amounts of phosgene and dihydroxy reactants, however, the molar ratios can be varied dependent upon the reaction conditions.

The preferred polycarbonate utilized in this invention is obtained when Ar is p-phenylene and A is isopropylidene. This polycarbonate is prepared by reacting para, para'-isopropylidenediphenol with phosgene and is sold by General Electric Company under the trademark Lexan. Other polycarbonates may be prepared by reacting other dihydroxy compounds, or mixtures of dihydroxy compounds, with phosgene. The dihydroxy compounds may include aliphatic dihydroxy compounds although for best high temperature properties aromatic rings are essential. The dihydroxy compounds may include within the structure diurethane linkages. Also, part of the structure may be replaced by siloxane linkage. These and other variations of polycarbonate structure are described in the Schnell reference cited above. The same reference presents a long list of monomers (particularly dihydroxy compounds) that may be used in polycarbonate synthesis.

THE POLYSULFONES

The polysulfones that may be utilized in the blends of the present invention are polysulfones of the general formula

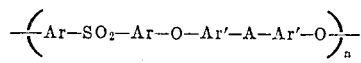

wherein Ar and Ar' are selected from the group consisting of phenylene, alkyl, alkoxy, halogen and nitro-substituted phenylene and A is selected from the group consisting of carbon-to-carbon bonds, alkylidene, cycloalkylidene, carbonyl sulfoxide, sulfur, sulfone, azo, imino and oxygen; and $n$ is at least two.

In the formula above, the polysulfones are preferably derived from dichlorodiphenyl sulfones reacted with bisphenols. A second group is where Ar and Ar' are phenylene and A is sulfone. A third major group of polysulfones are prepared wherein Ar and Ar' are phenylene and A is oxygen. When Ar is phenylene, it should preferably be either meta or para and may be substituted in the ring positions with alkyl groups such as methyl, ethyl and propyl. The alkoxy groups above referred to may be groups such as methoxy and propoxy groups. The primary compounds useful in the blends of this invention are those derived from disulfonyl chlorides such as 4,4-biphenyldisulfonyl chloride reacted with diphenyl ether.

The polysulfones useful in this invention may be prepared in a variety of ways such as by nucleophilic aromatic substitution which is described in the Journal of Polymer Science, PTA-152375-98 (1967) or by condensation procedures which are described in British Pat. 1,060,546.

The preparation of the blends of this invention, a very wide range of amounts of polycarbonate, polysulfone and graft polymer (containing free copolymer and added copolymer) may be blended to provide a composition with the required properties for a given end use. The composition may range, for example, from 10% to 90% by weight of graft polymer-copolymer components with correspondingly 10%–90% by weight of the remaining polycarbonate-polysulfone components. In the polycarbonate-polysulfone composition, the polycarbonate may comprise from about 10% by weight to 90% by weight of the total composition with the polysulfone correspondingly comprising from about 90% by weight to about 10% by weight of the total composition. The preferred blend is wherein the graft polymer-copolymer comprises approximately 25–80% by weight of the composition and the polysulfone and polycarbonate comprise the other 20–75% by weight of the total composition. The blends of this invention are extraordinarily useful for applications wherein the combination of good processing properties, high impact strengths and high heat distortion temperatures are required.

It is interesting to note that polysulfone per se, blended with ABS graft polymer and copolymer does not provide blends with high impact strengths, however, when the polycarbonate, is blended with the polysulfone copolymer, graft polymer and copolymer, an unexpected increase in impact strength is noted.

The specific invention will be more fully understood from a reading of the following examples which set forth various combinations of the blending ingredients of this invention with the physical and chemical properties of the various compositions. All parts are by weight unless otherwise indicated.

In the examples, a graft polymer-copolymer blend (25/75) was used. The graft polymer was prepared by polymerizing about 35 parts by weight styrene and 18 parts by weight acrylonitrile in the presence of about 50 parts by weight polybutadiene and the copolymer comprised about 66% α-methylstyrene, 26% acrylonitrile and 5% styrene. The graft polymer-copolymer blend thus is a composition wherein a substantial amount of copolymer is present. It is understood that the graft polymer-copolymer combination may contain from 10% to 90% by weight graft polymer with correspondingly 90% to 10% by weight copolymer.

The polycarbonate utilized in the examples was Lexan (trademark of General Electric) prepared by copolymerizing para,para'-isopropylidenediphenol with phosgene. The polysulfone utilized in the examples are Bakelite P1700 manufactured by Union Carbide Corporation. The polyethylene powder was finely divided high density (.97) polyethylene resin manufactured by U.S. Industries Chemical Company, a division of National Distillers and Chemical Corporation. The phosphate ester was Polygard manufactured by Uniroyal Chemical, a division of Uniroyal, Inc.

In preparing the blends, the components were placed in a Banbury mixer and masticated until they were homogeneous. The mixture was molded into test bars and physical tests were conducted which are recorded in the table hereinbelow.

It will be noted that the compositions varied over an extremely wide range of from about 10% to 90% by weight of graft polymer-copolymer components with correspondingly about 10% to 90% by weight of the polysulfone and polycarbonate component.

It will be apparent to those skilled in the art that the compositions of this invention will find utility where a specific combination of physical and chemical properties are required. For example, if a high impact blend is required and high heat distortion temperatures are also needed, Example K would be chosen. If extremely high impacts are not required, and it is imperative that the heat distortion temperature be in excess of 300° F., Example I would be chosen. In each specific instance, a given, tailored combination can be obtained without going outside the range of the blends set forth in the table.

The invention has been described in connection with certain specific embodiments thereof; however, it will be understood that this is by way of illustration and not limitation. The invention is defined solely by the appended claims which should be construed as broadly as is consistent with the prior art.

What is claimed is:

1. A thermoplastic blend comprised of components (A) and (B) wherein component (A) is from about 10% by weight to about 90% by weight graft polymer blended with correspondingly 90% by weight to about 10% by weight copolymer, wherein the graft polymer is prepared by polymerizing 40–90% by weight of a monovinylaromatic hydrocarbon monomer and a monomer selected from the group consisting of acrylonitrile, halogen and alkyl substituted acrylonitrile and acrylic acid esters in the presence of from about 60% by weight to about 10% by weight of a prepolymerized polymer selected from the group consisting of conjugated diene homopolymer and copolymers prepared by polymerizing a conjugated diene with a monomer copolymerizable therewith and wherein said copolymer is prepared by polymerizing a monovinylaromatic hydrocarbon with a monomer selected from the group consisting of acrylonitrile, alkyl and halogen substituted acrylonitrile and acrylic acid esters and wherein said component (A) is blended in an amount of from 10–90% by weight with correspondingly 90% by weight to about 10% by weight (B) and wherein (B) is a polycarbonate-polysulfone resin blend wherein the polycarbonate is selected from the group consisting of polycarbonates of the general formulae

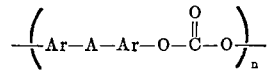

and

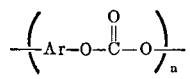

wherein Ar is selected from the group consisting of phenylene and alkyl-, alkoxyl-, halogen- and nitro-substituted phenylene, A is selected from the group consisting of carbon-to-carbon bond, alkylidene, cycloalkylidene, alkylene, cycloalkylene, imino, azo, oxygen, sulfur, sulfoxide and sulfone and $n$ is at least two and wherein said polycarbonate comprises from 10–90% by weight of the total polycarbonate-polysulfone resin blend and the polysulfone utilized is of the formula

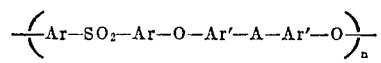

wherein Ar and Ar' are selected from the group consisting of phenylene, alkyl, alkoxy, halogen and nitro-substituted phenylene and A is selected from the group consisting of carbon-to-carbon bond, alkylidene, cycloalkylidene, carbonyl, sulfoxide, sulfur, sulfone, azo, imino and oxygen and $n$ is at least two and wherein the polysulfone correspondingly comprises from 90% by weight to 10% by weight of the polycarbonate-polysulfone resin.

2. The thermoplastic blend of claim 1 wherein the monovinylaromatic hydrocarbon monomer is styrene, the nonomer selected from the group consisting of acrylonitrile, alkyl and halogen substituted acrylonitrile and acrylic acid nitriles is acrylonitrile, and the polymeric compound selected from the group consisting of conjugated diene homopolymers and conjugated diene copolymers is polybutadiene.

3. The thermoplastic blend of claim 1 wherein the polycarbonate and polysulfone are added in substantially equal amounts.

4. The thermoplastic blend of claim 1 wherein the polycarbonate is the condensation product of the reaction of phosgene with para, para'-isopropylidenediphenol, and wherein the polysulfone is the condensation product of the reaction of dichlorodiphenyl sulfone with a bisphenol.

5. The thermoplastic blend of claim 1 wherein the monovinylaromatic monomer utilized to prepare the copolymer is alpha-methylstyrene.

References Cited

UNITED STATES PATENTS

| 3,130,177 | 4/1964 | Grabowski | 260—873 |
| 3,162,695 | 12/1964 | Grabowski | 260—873 |
| 3,192,178 | 6/1965 | Basdekis et al. | 260—876 |
| 3,242,231 | 3/1966 | Graham et al. | 260—873 |
| 3,555,119 | 1/1971 | Inqulli et al. | 260—876 |

WILLIAM H. SHORT, Primary Examiner

E. WOODBERRY, Assistant Examiner

U.S. Cl. X.R.

260—876 R